US008230095B2

(12) United States Patent
Tsui et al.

(10) Patent No.: US 8,230,095 B2
(45) Date of Patent: Jul. 24, 2012

(54) SYSTEM AND METHOD FOR INTEGRATED ON-DEMAND DELIVERY OF OPERATING SYSTEM AND APPLICATIONS

(75) Inventors: Andrew Kin Ning Tsui, Danville, CA (US); Satya Mylvara, Sunnyvale, CA (US); Mark Calomeni, San Jose, CA (US); Amit Deshpande, Santa Clara, CA (US); Andy Fausak, San Jose, CA (US)

(73) Assignee: Wyse Technology, Inc., San Jose, CA (US)

( * ) Notice: Subject to any disclaimer, the term of this patent is extended or adjusted under 35 U.S.C. 154(b) by 1859 days.

(21) Appl. No.: 10/840,390

(22) Filed: May 7, 2004

(65) Prior Publication Data

US 2006/0031547 A1 Feb. 9, 2006

(51) Int. Cl.
G06F 15/16 (2006.01)
(52) U.S. Cl. ....................................... 709/231; 709/203
(58) Field of Classification Search .................. 709/231, 709/203
See application file for complete search history.

(56) References Cited

U.S. PATENT DOCUMENTS

| | | | |
|---|---|---|---|
| 5,280,627 A | 1/1994 | Flaherty et al. |
| 5,325,532 A | 6/1994 | Crosswy et al. |
| 5,404,527 A | 4/1995 | Irwin et al. |
| 5,452,454 A | 9/1995 | Basu |
| 5,842,011 A | 11/1998 | Basu |
| 5,870,554 A | 2/1999 | Grossman et al. |
| 5,872,968 A | 2/1999 | Knox et al. |
| 5,948,101 A | 9/1999 | David et al. |
| 5,974,547 A | 10/1999 | Klimenko |

(Continued)

FOREIGN PATENT DOCUMENTS

GB 2 231 180 A 11/1990

(Continued)

OTHER PUBLICATIONS

"Appexpress Enterprise: Deliver and Manage High Performance Applications Rapidly Across the Web at a Dramatically Reduced Cost to the Enterprise", Endeavors Technology, < http://www.endeavors.com/as_enterprise.html> (3 pages), 2004.

(Continued)

*Primary Examiner* — David Lazaro
(74) *Attorney, Agent, or Firm* — McDermott Will & Emery LLP

(57) ABSTRACT

The present invention discloses a system and a method for integrated on-demand delivery of operating system and applications, where operating system images are separate and distinct from application images. Integration of operating system streaming and application streaming services makes streaming delivery possible to a wide range of client devices, including those without any local disk space such as thin-clients and diskless workstations. In addition, by integrating the centralized management of operating system delivery and application delivery, the present invention provides a complete solution to server-centric application management, thereby further reducing the total cost of ownership of network-based computing approach. Implementing the operating management functions at the client machine level of specificity and application management functions at the user level of specificity combined with providing separate and distinct operating system images and application images provides an inherently canonical architecture that allows proper scaling and affords appropriate security management functions. The result is a complete, scalable, robust, and reliable server-centric application and operating system management system with a lower total cost of ownership than existing products.

17 Claims, 15 Drawing Sheets

U.S. PATENT DOCUMENTS

| | | | |
|---|---|---|---|
| 5,987,625 | A | 11/1999 | Wolff |
| 6,138,234 | A | 10/2000 | Lee et al. |
| 6,151,674 | A | 11/2000 | Takatani |
| 6,202,091 | B1 | 3/2001 | Godse |
| 6,237,005 | B1* | 5/2001 | Griffin ................................ 1/1 |
| 6,272,629 | B1 | 8/2001 | Stewart |
| 6,282,642 | B1 | 8/2001 | Cromer et al. |
| 6,311,221 | B1* | 10/2001 | Raz et al. ...................... 709/231 |
| 6,430,687 | B1 | 8/2002 | Aguilar et al. |
| 6,453,334 | B1 | 9/2002 | Vinson et al. |
| 6,453,426 | B1 | 9/2002 | Gamache et al. |
| 6,463,530 | B1 | 10/2002 | Sposato |
| 6,473,857 | B1 | 10/2002 | Panas et al. |
| 6,532,537 | B1 | 3/2003 | Chen et al. |
| 6,535,976 | B1 | 3/2003 | Hoggarth et al. |
| 6,539,473 | B1 | 3/2003 | Hubacher et al. |
| 6,550,006 | B1 | 4/2003 | Khanna |
| 6,574,618 | B2 | 6/2003 | Eylon et al. |
| 6,598,159 | B1 | 7/2003 | McAlister et al. |
| 6,601,096 | B1 | 7/2003 | Lassiter, Jr. |
| 6,622,169 | B2 | 9/2003 | Kikinis |
| 7,100,154 | B2* | 8/2006 | Hicks ........................... 717/148 |
| 7,353,355 | B1* | 4/2008 | Tormasov et al. ............ 711/165 |
| 7,356,679 | B1* | 4/2008 | Le et al. ............................ 713/1 |
| 7,577,751 | B2* | 8/2009 | Vinson et al. ................. 709/231 |
| 2001/0034736 | A1 | 10/2001 | Eylon et al. |
| 2002/0029283 | A1 | 3/2002 | Beckett et al. |
| 2002/0069354 | A1 | 6/2002 | Fallon et al. |
| 2002/0087963 | A1 | 7/2002 | Eylon et al. |
| 2002/0138640 | A1* | 9/2002 | Raz et al. ...................... 709/231 |
| 2002/0161995 | A1 | 10/2002 | French et al. |
| 2003/0009657 | A1 | 1/2003 | French et al. |
| 2003/0023839 | A1 | 1/2003 | Burkhardt et al. |
| 2003/0046529 | A1 | 3/2003 | Loison et al. |
| 2003/0097553 | A1 | 5/2003 | Frye, Jr. |
| 2003/0115443 | A1 | 6/2003 | Cepulis et al. |
| 2003/0126242 | A1 | 7/2003 | Chang |
| 2003/0126426 | A1 | 7/2003 | Frye, Jr. |
| 2003/0195995 | A1 | 10/2003 | Tabbara |
| 2003/0200290 | A1 | 10/2003 | Zimmerman et al. |
| 2003/0208675 | A1 | 11/2003 | Burokas et al. |
| 2006/0224250 | A1 | 10/2006 | Callaghan |

FOREIGN PATENT DOCUMENTS

| | | |
|---|---|---|
| JP | 9-91143 A | 4/1997 |
| JP | 2000-132397 A | 5/2000 |
| JP | 2001-34458 A | 2/2001 |
| WO | WO 02/27492 A1 | 4/2002 |

OTHER PUBLICATIONS

"AppStram Technology for Windows", AppStream, < http://www.appstream.com/html/products/appWndows.html> (2 pages), 2004.

"BXP—Image Management & Deployment Software", Venturcom, <http://www.vci.com/products/network_centric/BXPInfo.asp> (2 pages), 2004.

"Qualystem LAN-PC", Qualystem Technology, < http://www.qualystem.com/en/lannetpc.html> (3 pages), 2004.

Bassett et al., "Method and Apparatus for Efficient Transmission of Operating System and/or Application Software to Network Computer System," IBM Technical Disclosure Bulletin RD v41 n415 11-98 article 415118, Nov. 1, 1998, p. 1, IP.Com, Inc.

"Bootable hard drive emulation for Windows clients," 3COM XP-02263462; retrieved Dec. 1, 2003, www.argontechnology.com/docs/pdf/vld.pdf.

* cited by examiner

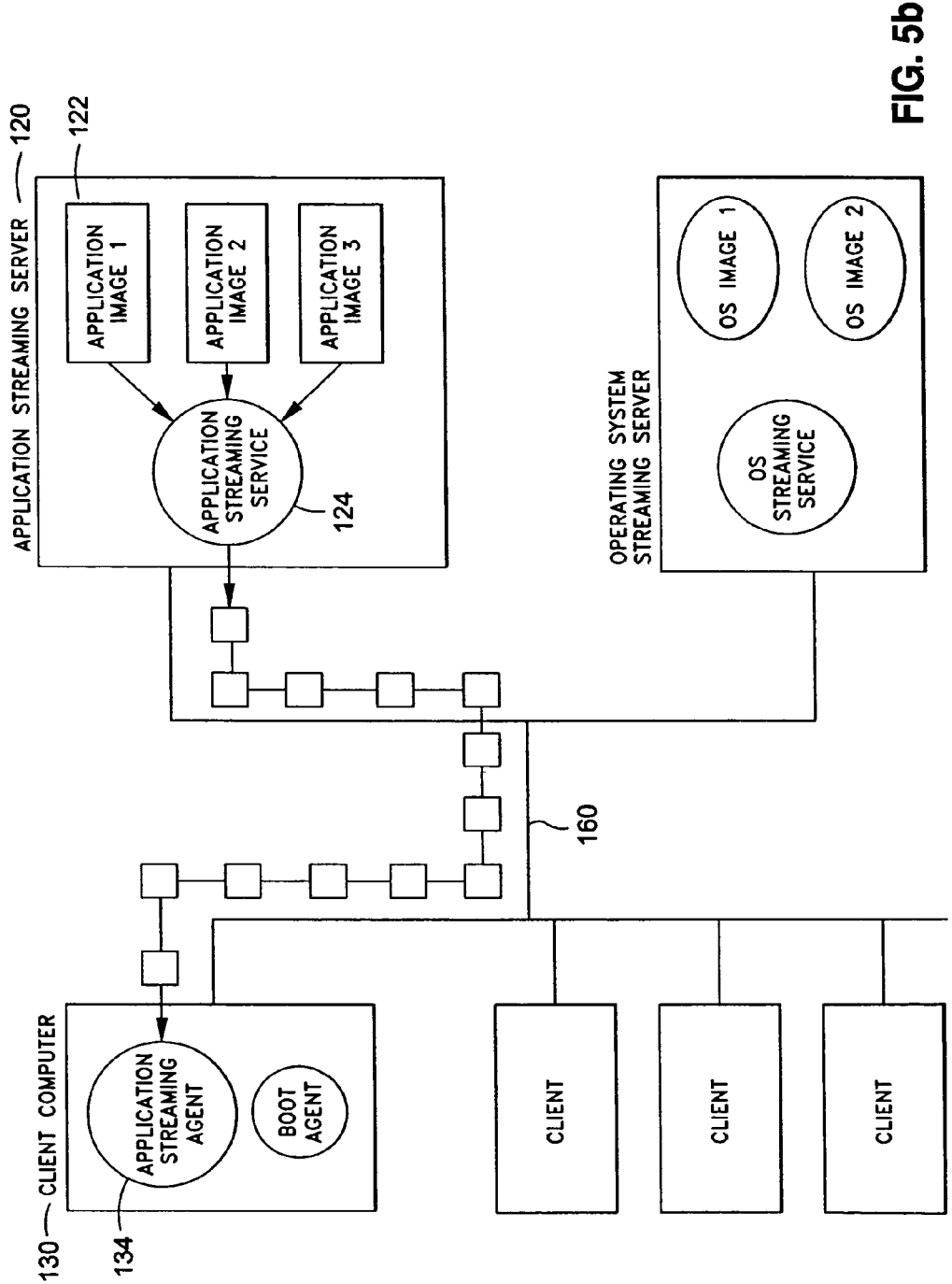

Account — 610

612 — Account Name | Department — 614

| Account Name | Department |
|---|---|
| Admin | Technology |
| User 1 | Engineering |
| User 2 | Marketing |
| User 3 | Sales |

FIG. 6a

Application — 620

622 — 624 — 626 — 628 — 629

| Application Name | Image | Image Size | Active | OS |
|---|---|---|---|---|
| AutoCAD | CADImage | 500K | Yes | Win2K |
| Microsoft Office | MSOffice | 1M | Yes | Win2K |
| Photoshop | PhotoIm | 250K | No | Win98 |

FIG. 6b

License Usage — 630

632 — 634 — 636

| Application | Maximum Users | Current Users |
|---|---|---|
| AutoCAD | 1000 | 445 |
| Microsoft Office | 2350 | 557 |

FIG. 6c

Client Machine 650

| Machine Name | Mac Address | IP Address | Default User |
|---|---|---|---|
| Client 1 | 00-0B-DB-34-59-83 | 172.134.34.250 | User 1 |
| Client 2 | 00-01-DB-66-F9-85 | 172.134.34.252 | User 3 |

FIG. 6e

Server 670

| Server Name | IP Address | Port |
|---|---|---|
| Application Server | 172.134.34.123 | 8000 |
| Web Server | 172.134.34.213 | 80 |
| Packager | 172.134.34.34 | |

FIG. 6f

OperatingSystem 680

| OS Name | Image | Image Size | Active |
|---|---|---|---|
| Windows 2000 | Win2K.vol | 4M | Yes |
| Windows XP | WinXP.vol | 4M | Yes |
| Windows 98 | Win98.vol | 3.5M | No |

FIG. 6g

SYSTEM AND METHOD FOR INTEGRATED ON-DEMAND DELIVERY OF OPERATING SYSTEM AND APPLICATIONS

BACKGROUND OF THE INVENTION

1. Field of the Invention

The present invention relates generally to delivering operating systems and applications to client computers, and specifically to integrated on-demand delivery of operating system and applications to client computers over a network.

2. Description of the Related Art

Network-based computing models have been gaining popularity in recent years as cost effective approaches to managing enterprise computing needs. Ranging from network-managed PCs, network computers, thin-clients, to server-centric clients, network-based computing is largely motivated by the need to reduce the cost of providing IT services (known as the Total Cost of Ownership, TCO) in networked computing environments. It is well known in the industry that the most expensive part of providing computing resources to end-users is not the cost of the computing hardware and software but the cost of on-going maintenance and management. See, Thin Client Benefits, Newburn Consulting (2002); Total Cost of Application Ownership, The Tolly Group Whitepaper (1999); TCO Analyst: A White Paper on GartnerGroup's Next Generation Total Cost of Ownership Methodology, GartnerConsulting (1997). According to these well known studies, network-based computing models can significantly reduce the TCO by centralizing the maintenance and management functions of IT services, thereby reducing the recurring cost of on-going maintenance and management.

New techniques are being developed in the continuing quest to achieve a lower TCO without compromising performance and reliability. Of particular interest are Operating System (OS) Streaming and Application Streaming, which utilize streaming technologies to deploy Operating Systems and Applications to PCs or client computers.

Initially developed for Internet multimedia applications, streaming technology provides an advantageous method for timely delivery of time-sensitive or interaction-oriented data over a network. In video streaming, for example, instead of waiting until the entire video file is downloaded before beginning the playback, the video playback starts as soon as a sufficient portion of the file has been downloaded. Then, in a process called "prefetching" or "buffering", further frames are downloaded while the already-received frames are being played. The video playback appears seamless to the user, and the potentially very long delay for downloading the entire video file is eliminated.

Similarly, OS Streaming and Application Streaming systems leverage streaming technology to improve network computing performance. Network computers, such as diskless computers that boot across a network from a central server, have traditionally suffered from poor performance due to network latency. Traditional diskless network computer technology simply replaces "demand paging" disk access with network access. That is, whenever some code or data are needed on a client computer, they are brought in over the network rather than from a local disk. Since network latencies are several times greater than local disk access delays, code and data access times are much longer, degrading the performance of network computers. Other traffic on the network can further worsen the performance of these computers. However, with OS Streaming and Application Streaming systems, the files necessary to run or execute an OS or application are "prefetched" or "buffered" to the client computer in a manner analogous to video streaming such that the OS or application can run seamlessly without being affected by the delays due to finite network response time or bandwidth. At the same time, centralized installation, delivery and management of operating systems or applications are made possible, because the OS or application files are delivered to the client computers from a central server.

At present, OS Streaming systems are provided by vendors such as Venturcom and Qualystem. More commonly known as Remote Boot or Network Boot technology, the existing OS Streaming solutions provide the core OS files needed to boot or initially load the operating system onto the client computer by streaming methodology. Although the existing OS streaming solutions improves the performance of OS delivery over the traditional network computing, they nevertheless suffer from significant shortcomings.

To start, once the initial OS loading is completed, the system reverts back to demand paging for further access of code or data necessary to run the client computers. For instance, application delivery provided in the existing OS streaming systems relies on demand paging. Typically, the applications are built into the operating system image and the entire OS-plus-applications image is delivered to the client computers. However, only the initial OS loading part is streamed, and the system relies on traditional demand paging once the operating system is up and running. Thus, when running applications on client computers—which comprises the bulk of users' interaction with the system—the performance of the existing OS Streaming systems is no better than the traditional diskless workstations, being limited by various network latencies.

In addition, the existing OS streaming solutions suffer from significant problem of scalability and management. For example, an entire operating system plus application images must be built for each end-user account because each end-user would want to select applications he or she needs. However, there is no reason to maintain more than one OS image for each client machine. That is, operating systems are specific to client machines, while the applications are specific to users. Thus, the OS-plus-application streaming approach incurs a waste of substantial storage space for each user—typically, several hundred megabytes per user. For enterprise systems with thousands of users, several hundred megabytes of wasted space per user would easily add up to terabytes of unnecessary storage requirement.

Another problem is that a new OS image must be built each time an application is added, removed, upgraded, or otherwise modified. A new OS-plus-applications image must be rebuilt whenever one of the applications have a "patch" (a minor fix or upgrade) applied to it. But, building operating system images is a resource intensive task, and repeating the task each time a patch is applied to an application—which is a relatively common event—is impractical in an environment with a large number of users. Fundamentally, these problems are due to the fact that operating systems are machine specific but the applications are user specific. In other words, the systems that manage OS and applications as a single unit are bound to scale poorly due to inherent mismatch of the levels of specificity between the operating system management and the applications management. A proper solution must take this fundamental difference into account.

The Application Streaming technology, on the other hand, addresses the problem of application delivery and management by utilizing the streaming technology. In a manner analogous to multimedia or OS streaming, the applications in an Application Streaming system are provided from the servers over the network, a block at a time, as the application blocks are needed by the client computer to run the application. However, the "prefetching" of application code or data must be more "intelligent" than OS streaming, since the code or data needed in an immediate or foreseeable future are not deterministically known due to the interactive nature of user driven application executions. Nevertheless, with intelligent prediction algorithms, Application Streaming systems can prefetch necessary code or data with sufficient predictive accuracy to minimize demand paging across the network, improving the application performance. At the same time, because the applications are provided from the servers, the management of application distribution, installation, and delivery can be centralized at the server, thereby further reducing the ever-increasing application management component of the TCO. Currently, various embodiments of Application Streaming technology are provided by vendors such as AppStream and Endeavors Technology.

Application Streaming technology, however, suffers from one significant shortcoming in that it requires a considerable local disk space for the system to function. This is because virtually all modern applications, such as the Microsoft Word, make use of local paging files—sometime called temporary files—which require a sizeable local storage space. These applications cannot run without sufficient disk space to write out the paging files. However, currently available Application Streaming solutions do not provide capability to write data or files out to the streaming server, as they stream data only in one direction from the server to clients. Thus, currently available Application Streaming technology cannot be used for client devices with no local storage space such as diskless PC's and thin-clients.

A highly desirable way to overcome this shortcoming is to integrate OS Streaming technology with Application Streaming technology. With an integrated streaming system, the local storage space required for the Application Streaming service can be provided by the OS Streaming service by enabling a virtual disk service over the network. It can be seen, then, there is a need in the field for an integrated OS Streaming and Application Streaming system.

Another shortcoming of Application Streaming technology is that it does not address the issue of operating system dependencies and management. There is no question that management of operating systems installed on the client computers is an important aspect of enterprise system management. Furthermore, application management systems that do not address operating system management are inherently incomplete because the installation and execution of applications are operating system dependent. For example, some applications written for Windows 98 will not install or run properly on Windows 2000 or Windows XP. Therefore, centralized management of application distribution and delivery cannot be fully effective and complete without comparable centralized management of operating systems on the client computers. Moreover, management of applications detached from operating system management can give rise to complexities and unexpected difficulties in enterprise system management, which ultimately result in higher TCO.

It can be seen, then, there is a need in the field for a system that provides centralized management of distribution and delivery of applications as well as operating systems, utilizing streaming technology for both application delivery and operating system delivery.

SUMMARY OF THE INVENTION

Accordingly, the present invention addresses the foregoing need by providing a system and a method for integrated on-demand delivery of operating system and applications.

According to one aspect of the invention, the present invention is a system for integrated on-demand delivery of operating system and applications to client computers over a network, the system comprising: at least one operating system image; an operating system streaming server; an operating system streaming agent for each client computer; at least one application image; an application streaming server; an application streaming agent for each client computer; and an integrated user interface for managing operating system delivery and application delivery. The system of the present invention can further comprise an integrated common database for managing the operating system delivery and the application delivery. In addition, the system of the present invention allows computer specific operating system delivery management and user specific application delivery management so that the system scales properly.

According to another aspect of the invention, the present invention is a method for integrated on-demand delivery of operating system and applications to a client computer over a network, comprising the steps of: providing an operating system streaming agent and an operating system streaming server; providing an application streaming agent and an application streaming server; providing at least one operating system image; providing at least one application image; providing an integrated user interface for managing operating system delivery and application delivery, wherein managing operating system delivery is client computer specific and managing application delivery is user specific; selecting an operating system for a client computer with the integrated user interface; selecting at least one application for a user with the integrated user interface; when the user logs on to the client computer, delivering the selected operating system to the client computer on-demand by streaming an operating system image for the selected operating system to the client computer via the operating system streaming agent and the operating system streaming server; and delivering the selected at least one application on-demand by streaming an application image for the at least one application to the client computer via the application streaming agent and the application streaming server.

According to yet another aspect of the invention, the present invention is a system for integrated on-demand delivery of operating systems and applications to client computers over a network, the system comprising: means for providing an operating system streaming server; means for providing an application streaming server; means for providing at least one operating system image; means for providing at least one application image, wherein the at least one operating system image is separate and distinct from the at least one application image; means for providing an integrated user interface for managing operating system delivery and application delivery to at least one client computer; means for selecting an operating system for a client computer with the integrated user interface; means for selecting at least one application for a user with the integrated user interface; means for, when the user logs on to the client computer, delivering the selected operating system to the client computer on-demand by streaming an operating system image for the selected operating system to the client computer; and means for delivering the selected at least one application on-demand by streaming an application image for the selected at least one application to the client computer.

Other and further objects and advantages of the present invention will be further understood and appreciated by those skilled in the art by reference to the following specification, claims, and drawings.

BRIEF DESCRIPTION OF THE DRAWINGS

Referring now to the drawings in which like reference numbers represent corresponding parts throughout:

FIG. 5b illustrates an overview of the Application Streaming process; and

FIG. 6a to FIG. 6g illustrate the possible entities in Integrated Common Database according to the present invention.

DETAILED DESCRIPTION OF THE INVENTION

Figure 1:
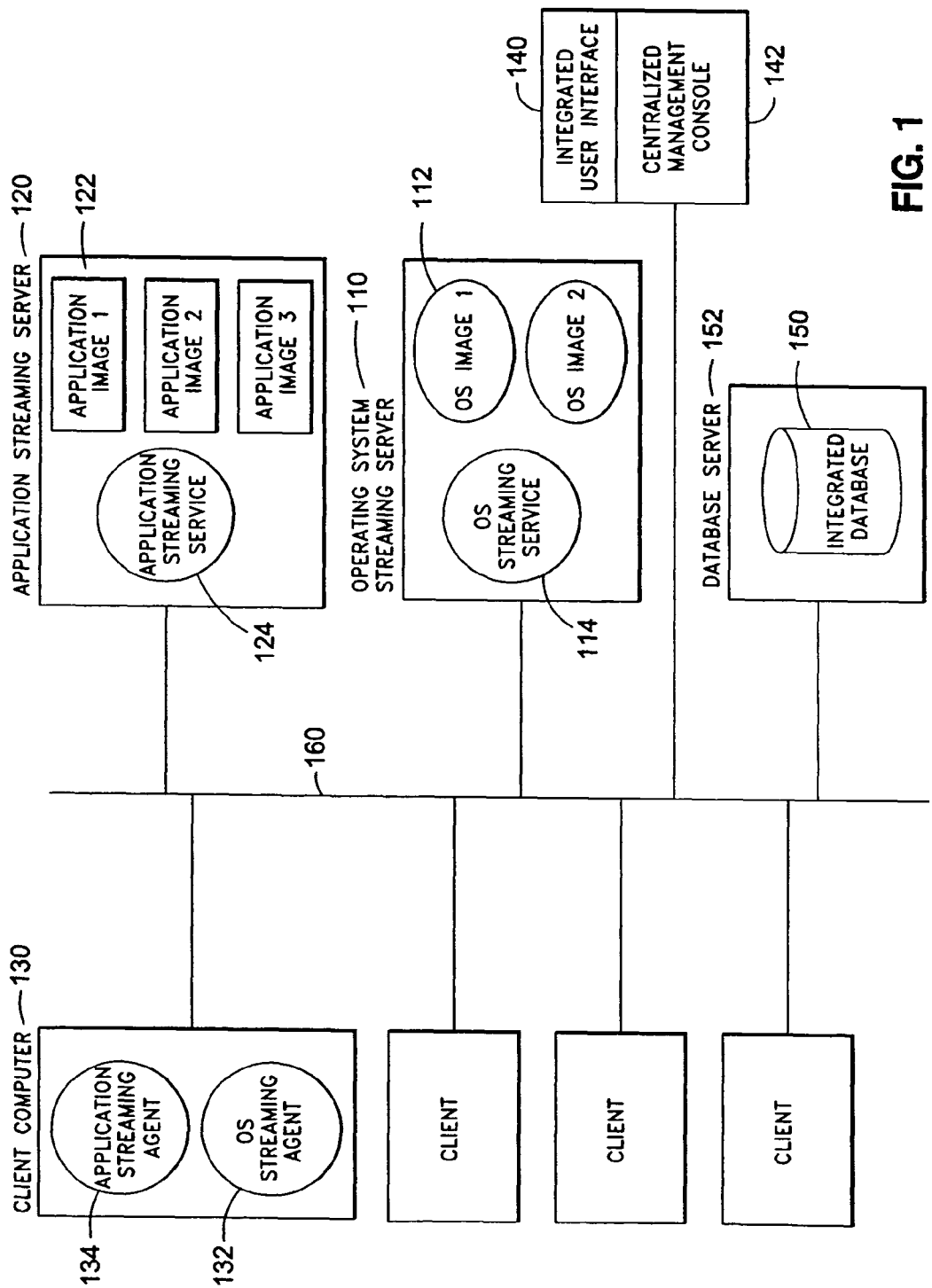
FIG. 1 illustrates a conceptual block diagram of a system according to the present invention.

FIG. 1 illustrates a conceptual block diagram of a system according to the present invention. As shown in FIG. 1, an embodiment of the system of the present invention can comprise: Operating System Streaming Server (110), Operating System Image (112), Operating System Streaming Service (114); Application Streaming Server (120), Application Image (122), Application Streaming Service (124); Client Computer (130), OS Streaming Agent (132), Application Streaming Agent (134), Integrated User Interface (140), Centralized Management Console (142), Integrated Common Database (150), and Database Server (152).

Client Computer (130) can be a thin client module, a PC, or a workstation without departing from the scope of the present invention. Client Computer (130) can also be any streaming client device ranging from a handheld device to a server class machine without departing from the scope of the present invention. In particular, Client Computer (130) can be a server machine such as a web server or an email server without departing from the scope of the present invention. That is, a machine that functions as a server for web or email service purposes can be a client for OS streaming purpose, and thus have its operating system streamed from an OS streaming server.

Operating System Streaming Server (110), Application Streaming Server (120), and Database Server (152) are logical units that can be placed on separate physical servers or on the same physical server machine. Furthermore, either one of Operating System Streaming Server (110), Application Streaming Server (120), or Database Server (152) can itself be deployed on multiple physical servers such as server farms or server clusters.

Operating System Image (112) comprises a file which contains all of the components (kernel image, device drivers, executables, DLLs, etc.) necessary to execute an operating system such as the Microsoft Windows 98, Windows 2000, and Windows XP, and Linux. Analogously, Application Image (122) comprise a file which contains all of the components necessary to run an application such as the Microsoft Word, Excel, Outlook, and PowerPoint. It should also be noted that not every application needs to be streamed from Application Streaming Server (120). For some applications, especially small utility applications which set off little or no demand paging, application files can be included in Operating System Image (112) without departing from the scope of the present invention. Note that, for some operating systems such as the Microsoft Windows, some utility programs such as notepad and calculator are already a part of the operating system image.

In a preferred embodiment of the present invention, the streaming services of Operating System Streaming Server (110) is provided through Operating System Streaming Service (114) which can be a service process or a service daemon without departing from the scope of the present invention. Similarly, the streaming services of Application Streaming Server (120) can be provided through Application Streaming Service (124). In an alternate embodiment, Operating System Streaming Service (114) or Application Streaming Service (124) can also be implemented as service threads within a service process without departing from the scope of the present invention. In yet another embodiment, both Operating System Streaming Service (114) and Application Streaming Service (124) can be implemented as service threads within a single service process without departing from the scope of the present invention. In a such embodiment, only one service process appears to exist to the operating system. Nevertheless, Operating System Streaming Service (114) and Application Streaming Service (124) are provided by separate service threads within the service process.

In one embodiment of the present invention, Client Computer (130), Operating System Streaming Server (110), Application Streaming Server (120), and Database Server (152) communicate with each other over Network (160). However, in an embodiment where any of Operating System Streaming Server (110), Application Streaming Server (120), or Database Server (152) is deployed on the same physical server as any of the other Servers, the communication between the servers will take place within the same machine, without departing from the scope of the present invention.

Figure 2A:
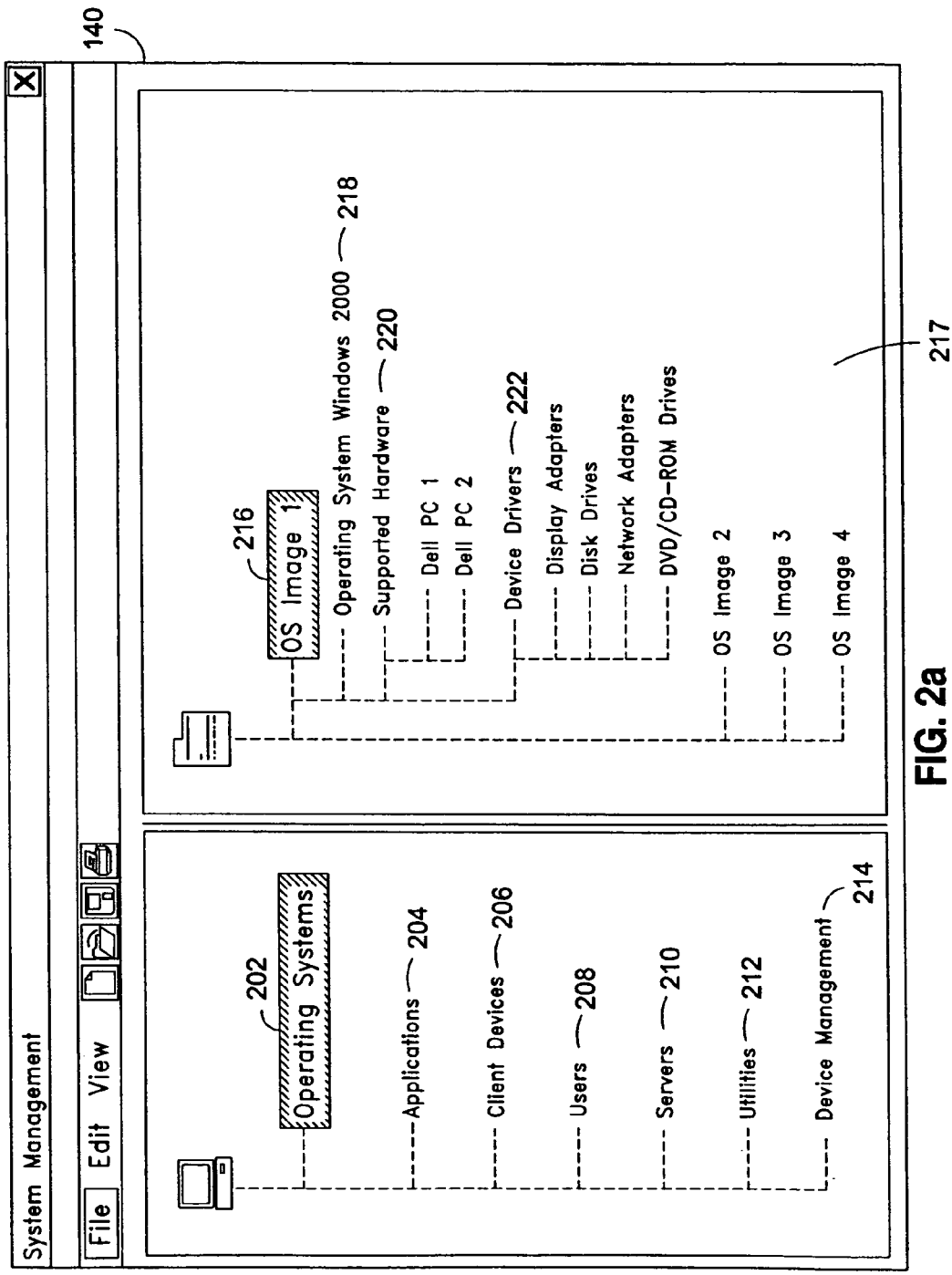
FIG. 2a illustrates an integrated user interface screen for integrated system management functions according to the present invention.

FIG. 2a illustrates an integrated user interface screen for integrated system management functions according to the present invention. As shown in FIG. 2a, Integrated User Interface (140) includes integrated system management functions for managing all functional subcomponents of the integrated system of the present invention. In general, Integrated User Interface (140) would be executed by a system administrator on a system administration workstation such as Centralized Management Console (142), although it can be run on any computer on Network (160) without departing from the scope of the present invention. By utilizing Integrated User Interface (140), system administrators would set up and configure client computers, operating systems, and users.

In particular, FIG. 2a shows user interface elements Operating Systems (202) for managing operating system images, Applications (204) for managing application images, Client Devices (206) for managing client devices, Users (208) for managing users, and Servers (210) for managing servers. FIG. 2a also shows user interface elements Utilities (212) for accessing image build utility functions, and Device Management (214) for managing and controlling devices in the system.

As shown in FIG. 2a, Operating Systems (202) user interface element is selected, causing the right pane to display available operating system images. OS Image 1 (216) is selected on the right pane (217), showing the operating system for the image, Windows 2000 (218), as well as Supported Hardware (220), and Device Drivers (222).

Figure 2B:
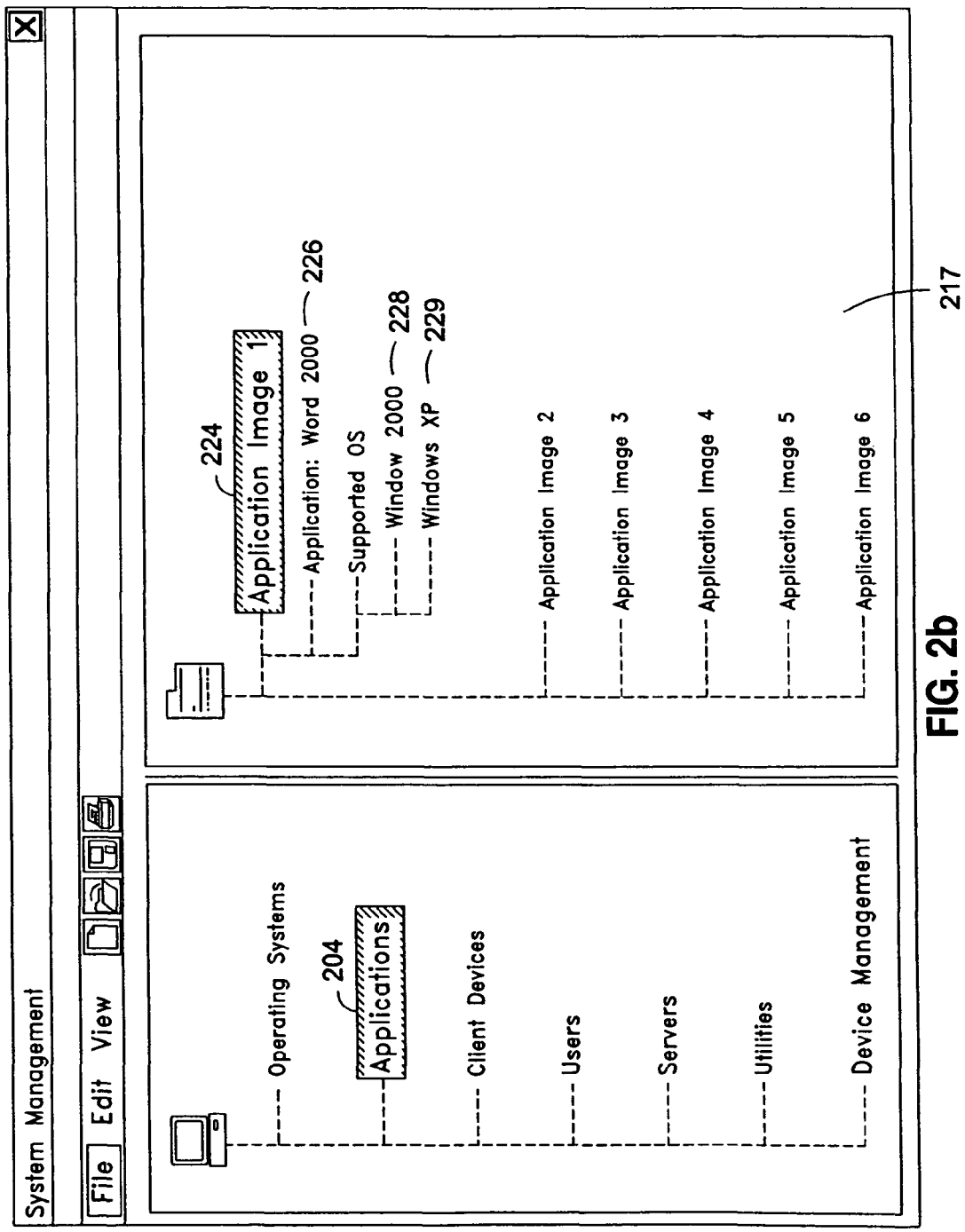
FIG. 2b illustrates an integrated user interface screen for application image management functions according to the present invention.

FIG. 2b illustrates an integrated user interface screen for application image management functions according to the present invention. As shown in FIG. 2b, Applications (204) user interface element is selected, and right pane (217) displays available application images in the system. In particular, Application Image 1 (224) is selected, showing that the image is for Word 2000 (226) application, and the supported operating systems are Windows 2000 (228) and Windows XP (229).

Figure 2C:
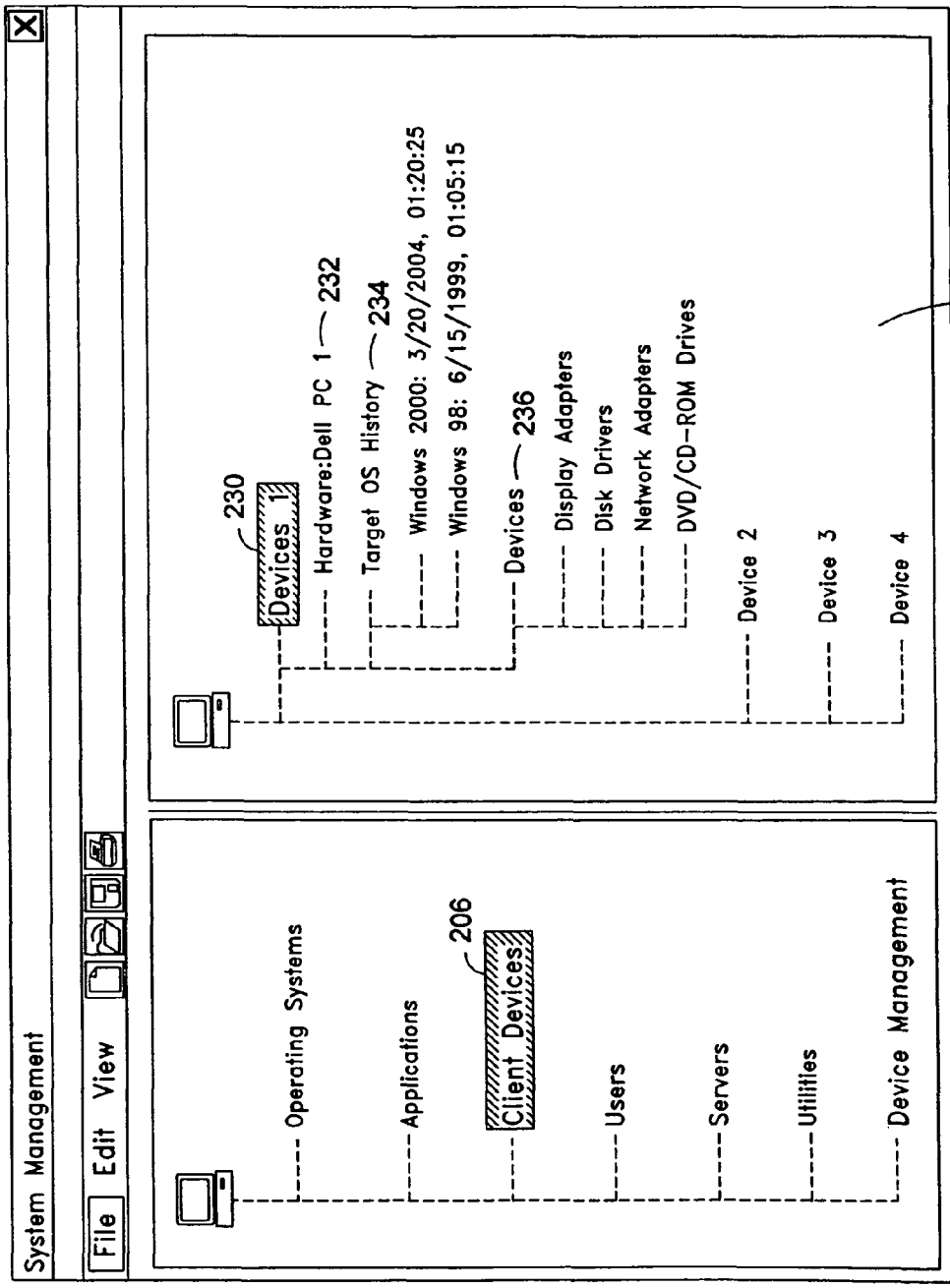
FIG. 2c illustrates an integrated user interface screen for client device management functions according to the present invention.

FIG. 2c illustrates an integrated user interface screen for client device management functions according to the present invention. FIG. 2c shows Client Devices (206) user interface element being selected, and right pane (217) display of available client devices. FIG. 2c also shows selection of Device 1 (230) in particular, and resulting display of Hardware (232), Target OS History (234), and Devices (236).

Figure 2D:
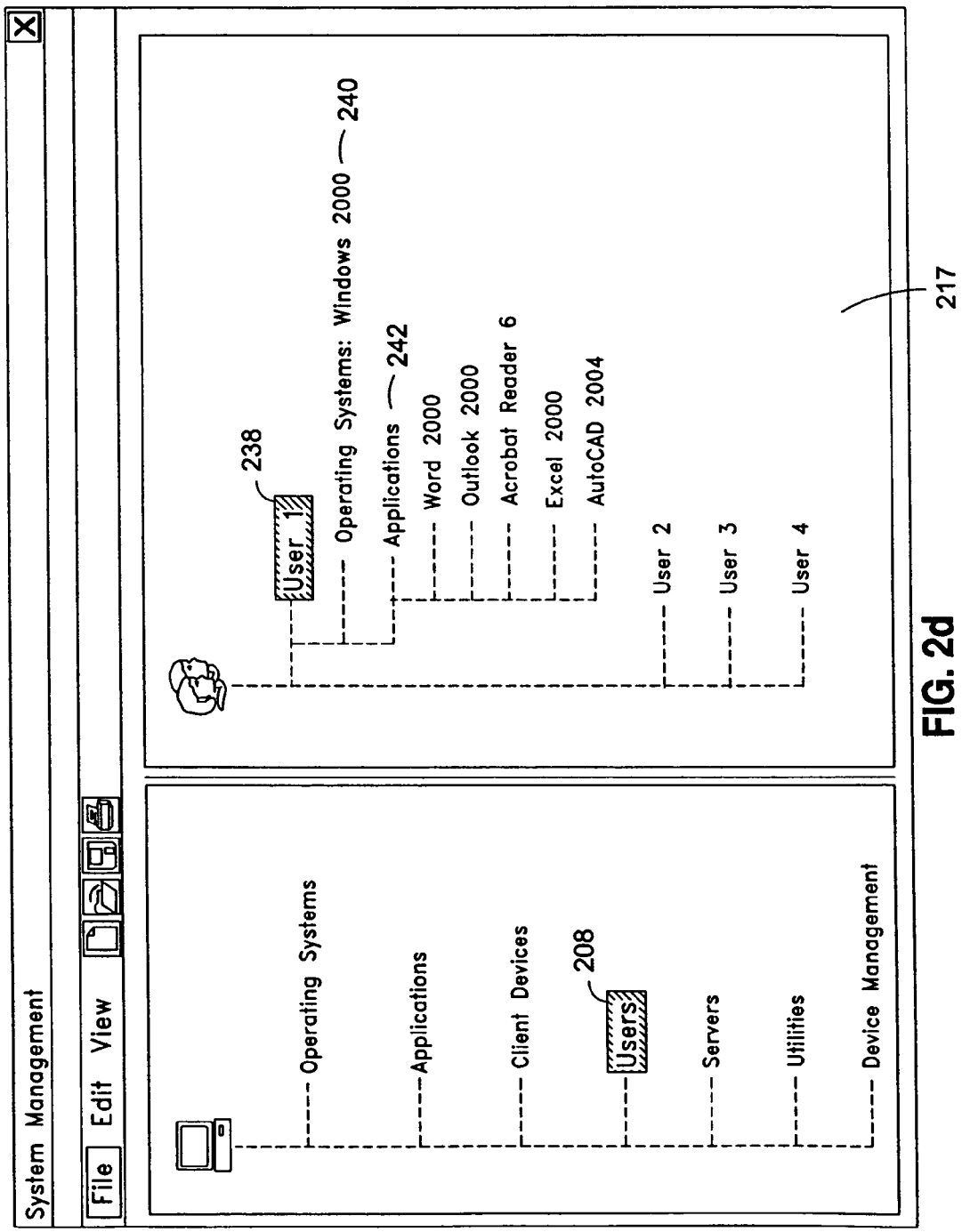
FIG. 2d illustrates an integrated user interface screen for user management functions according to the present invention.

FIG. 2d illustrates an integrated user interface screen for user management functions according to the present invention. As shown in FIG. 2d, Users (208) user interface element is selected, causing a display of users in right pane (217). As also shown, User 1 (238) is selected, resulting in a display of assigned Operating System (240) and Applications (242).

Figure 2E:
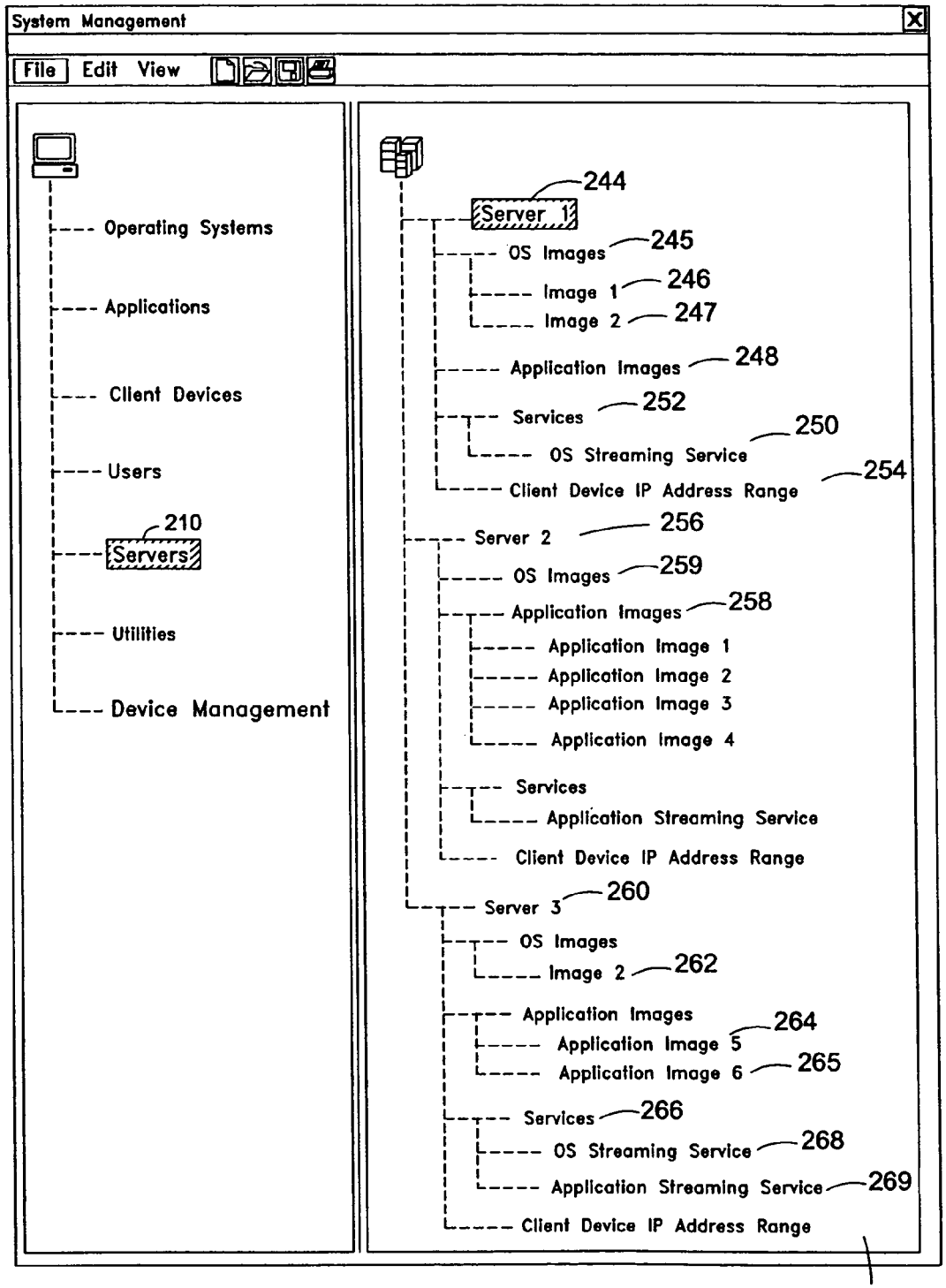
FIG. 2e illustrates an integrated user interface screen for server management functions according to the present invention.

FIG. 2e illustrates an integrated user interface screen for server management functions according to the present invention. As shown in FIG. 2e, Servers (210) user interface element is selected, and available servers are thereby displayed on right pane (217). Under Server 1 (244), OS Images (245) tree shows available operating system images—Image 1 (246) and Image 2 (247)—on Server 1 (244). However, there is no entry under Application Images (248), showing that Server 1 (244) is being used for streaming operating systems only. Hence, only OS Streaming Service (250) is displayed under Services (252) tree. Client Device IP Address Range (254) element is used to access client device IP Address display and management functions. Also shown in FIG. 2e is Server 2 (256) which has entries for Application Images (258), but nothing under OS Images (259), indicating that Server 2 (256) operates as Application Streaming Server only. In contrast, Server 3 (260) has OS image, Image 2 (262), as well as application images, Application Image 5 (264) and Application Image 6 (265), showing that Server 3 (260) serves as OS Streaming Server as well as Application Streaming Server. Hence, Services (266) tree shows both OS Streaming Service (268) and Application Streaming Service (269) being active on Server 3 (260).

Figure 2F:
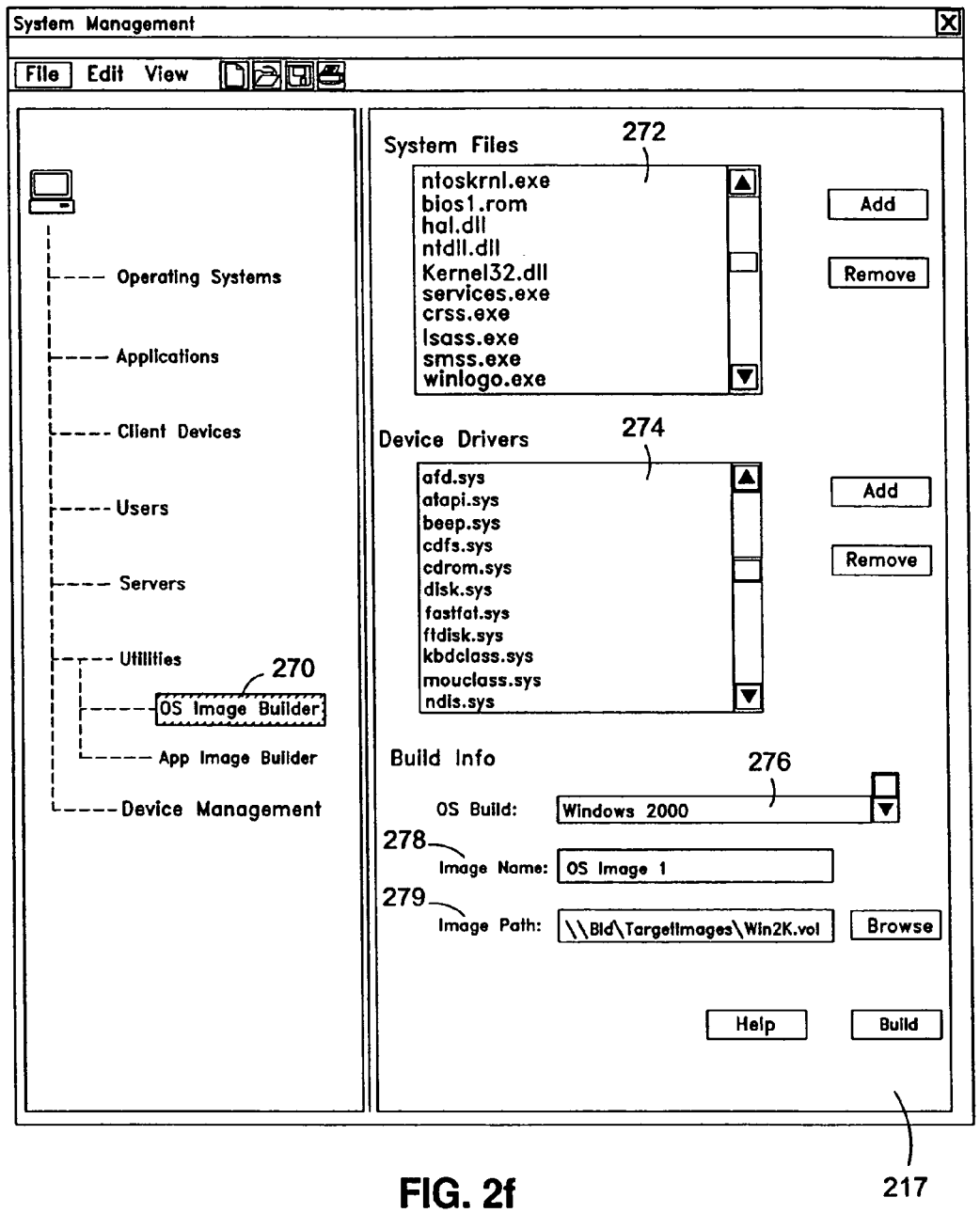
FIG. 2f illustrates an integrated user interface screen for image build utility functions according to the present invention.

FIG. 2f illustrates an integrated user interface screen for image build utility functions according to the present invention. As shown in FIG. 2f, OS Image Builder (270) user interface element is selected, and right pane (217) thereby shows OS build function screen. System Files list box (272) shows the operating system kernel files needed to build a functional operating system image, and Device Drivers list box (274) shows the system device drivers. In addition, OS Build dropdown box (276) shows that the operating system being built is Windows 2000. As also shown, Image Name (278) and Image Path (279) can be specified.

Figure 2G:
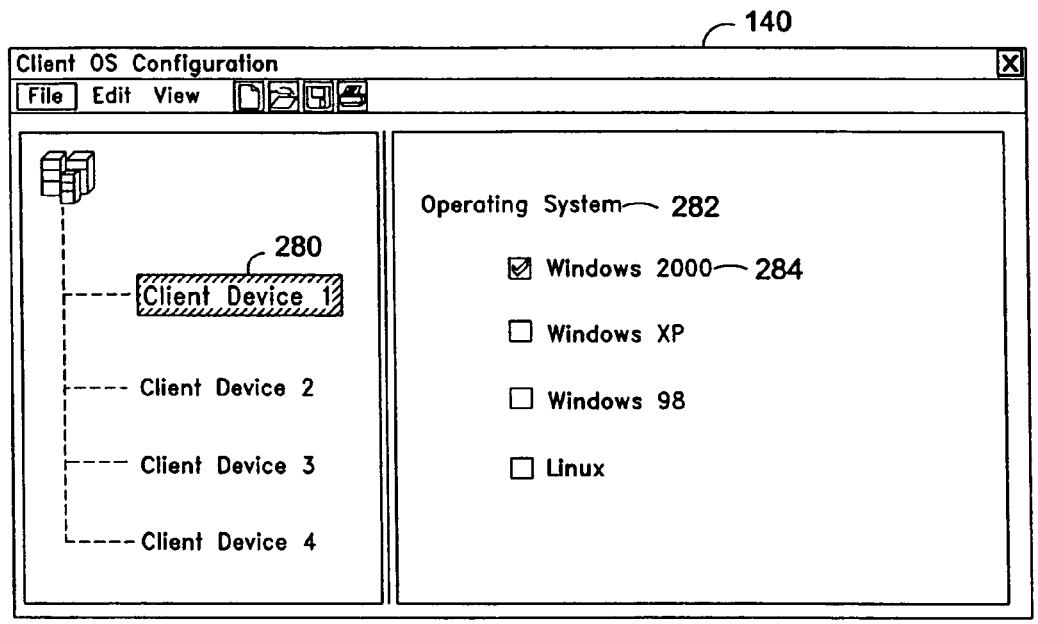
FIG. 2g illustrates an integrated user interface screen for selecting an operating systems for a client computer according to the present invention.

FIG. 2g illustrates an integrated user interface screen for selecting an operating systems for a client computer according to the present invention. This screen can be accessed from the client device management function screen of the integrated system management user interface described above. As shown in FIG. 2g, Integrated User Interface (140) includes functions to select an operating system for a client computer. For example, FIG. 2a shows an user interface screen where Client Computer 1 (280) has been selected for configuration. For Operating System field (282), Windows 2000 (284) is selected, indicating that a Windows 2000 operating system image will be streamed to Client Computer 1 (280) when the client boots. Thus, operating system management is client computer specific.

Figure 2H:
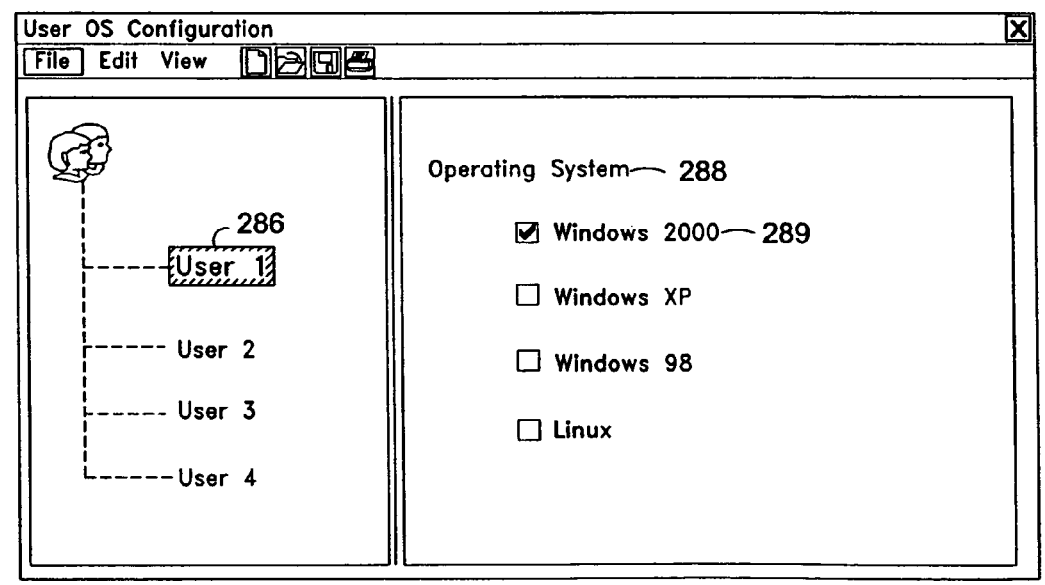
FIG. 2h illustrates an integrated user interface screen for selecting an operating system for a user according to the present invention.

FIG. 2h illustrates an integrated user interface screen for selecting an operating system for a user according to the present invention. As shown in FIG. 2h, User 1 (286) has been selected for operating system configuration. For Operating System field (288), Windows 2000 (289) is selected, indicating that a Windows 2000 operating system image will be streamed to the client computer where User 1 (286) logs in through a preboot login facility well known to those skilled in the art. Hence, operating system management can be user specific and/or client computer specific.

Figure 3A:
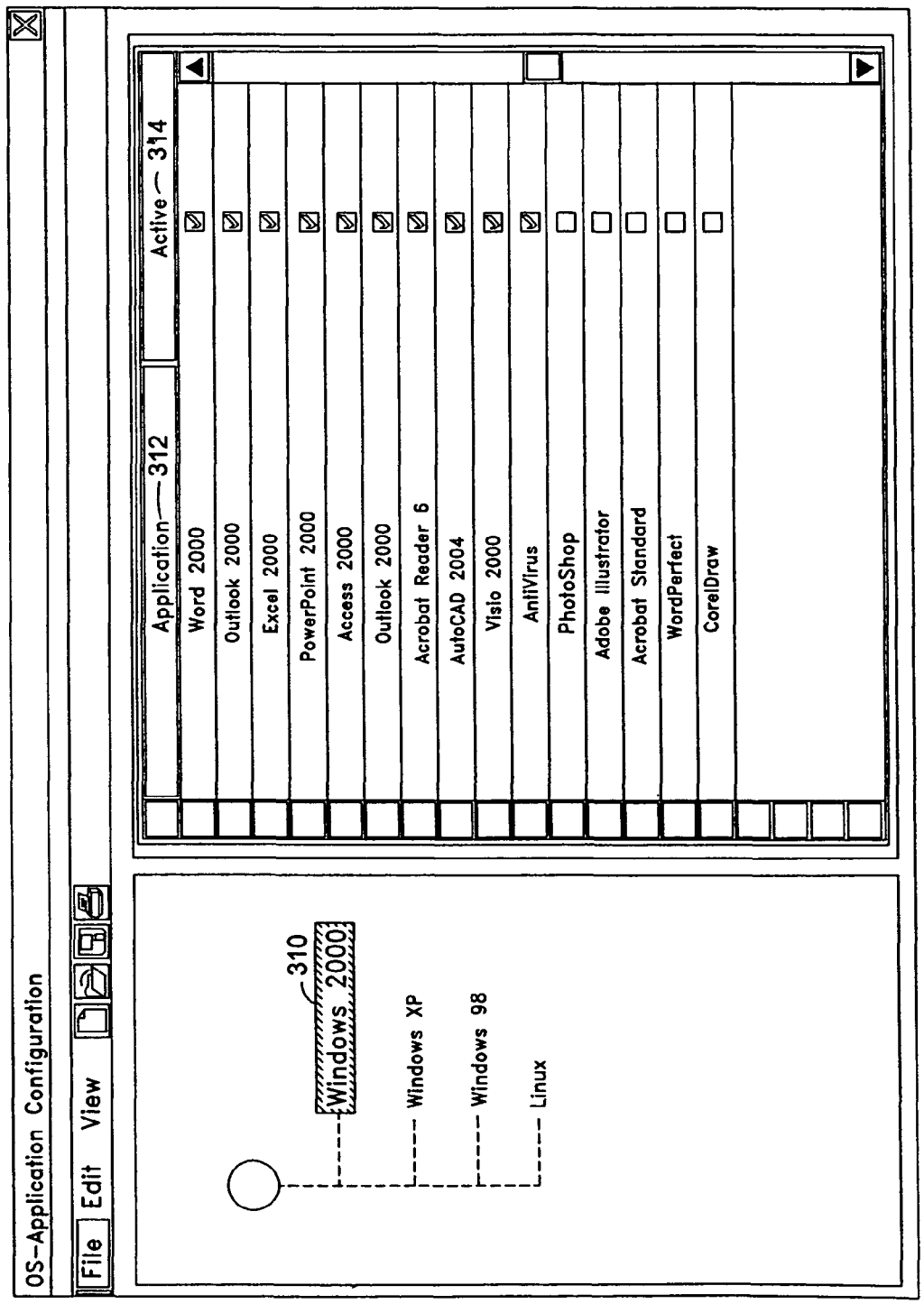
FIG. 3a illustrates an integrated user interface screen for selecting applications for a given operating system according to the present invention.

FIG. 3a illustrates an integrated user interface screen for selecting applications for a given operating system according to the present invention. As shown in FIG. 3a, Windows 2000 operating system (310) has been selected for application configuration. Applications available for the selected operating system are listed under Application field (312), and each available application can be set to an active or inactive status by utilizing the Active field (314).

Figure 3B:
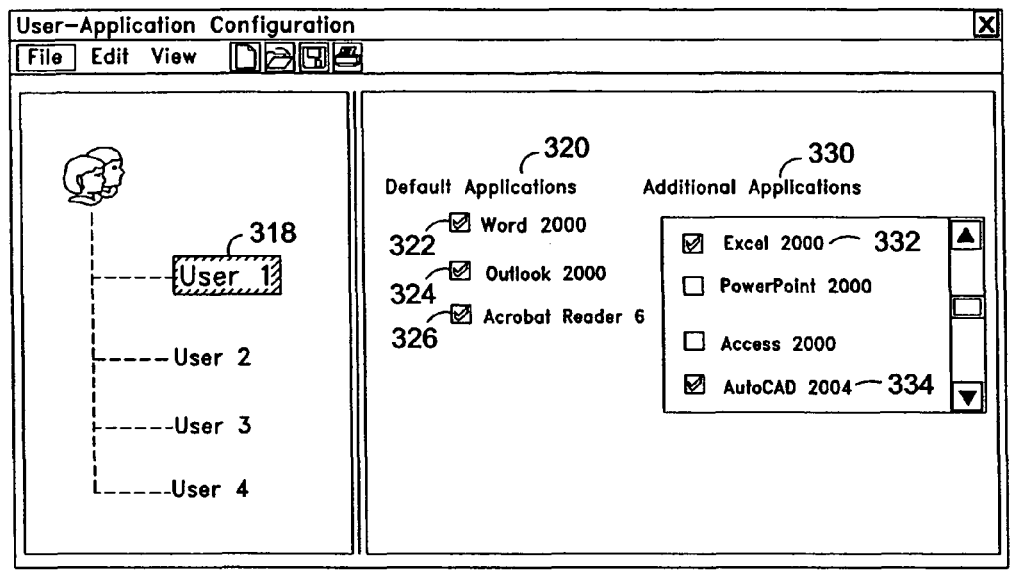
FIG. 3b illustrates an integrated user interface screen for selecting applications for a user according to the present invention.

FIG. 3b illustrates an integrated user interface screen for selecting applications for a user according to the present invention. As shown in FIG. 3b, User 1 (318) has been selected for configuration. For Default Applications field (320), Word 2000 field (322), Outlook 2000 field (324), and Acrobat Reader 6 field (326) have been selected, indicating default applications available for User 1 (318). Also shown in FIG. 3b is Additional Applications field (330), where Excel 2000 field (332) and AutoCAD 2004 field (334) have been selected.

Therefore, as shown in FIG. 2a to FIG. 2h, as well as in FIG. 3a and FIG. 3b, the present invention provides an integrated management of operating system delivery and application delivery, where the management of operating system delivery is client computer or machine specific and/or the management of application delivery is user specific. Thus, the present invention provides a system and a method for integrated on-demand delivery of operating system and applications which are properly scalable. Furthermore, the system security and access privileges can be managed properly at appropriate levels.

In another embodiment, Integrated User Interface (140) can be a web-based user interface, further providing flexibility, compatibility, and portability of the system across varying hardware and network environments.

Figure 4:
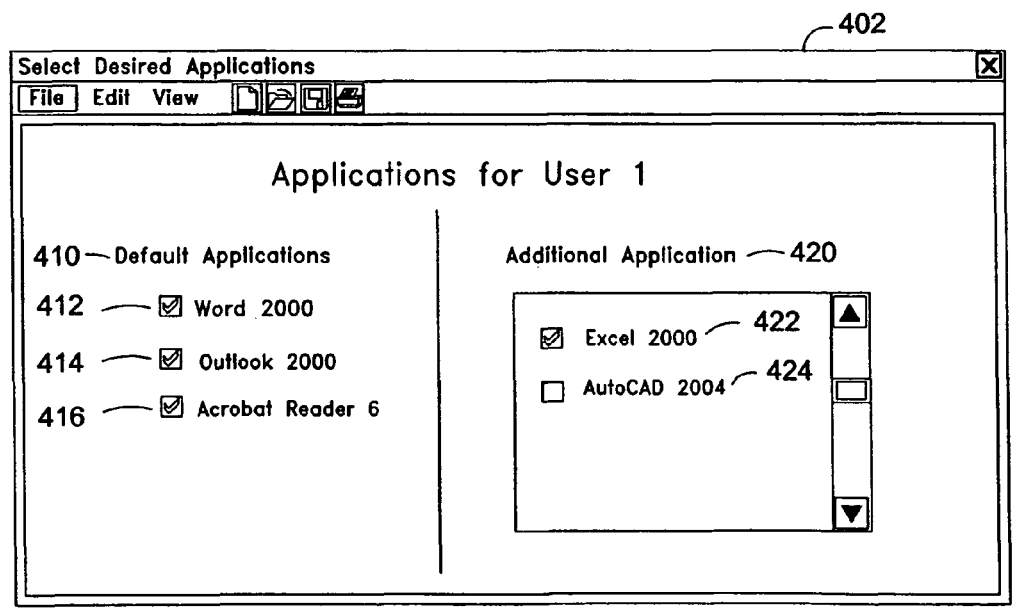
FIG. 4 illustrates a user interface screen for a user at a client computer according to the present invention.

Once the operating system and applications are configured by system administrators, users can access the provided computing resources by booting the operating system on the client computer and launching available applications from the operating system interface. In addition, users at the client computer can also choose to subscribe applications made available to them by the administrators. FIG. 4 illustrates a user interface screen for a user at a client computer according to the present invention. As shown in FIG. 4, User 1 (318) on Client Computer 1 (210) has access to configuring or customizing available application subscriptions on Client User Interface (402). For Default Applications field (410), Word 2000 field (412), Outlook 2000 field (414), and Acrobat Reader 6 field (416) have been selected, indicating default application subscriptions for User 1 (318) on Client Computer 1 (210). Also shown in FIG. 4 is Additional Applications field (420), where Excel 2000 field (422) has been selected, indicating that User 1 (318) has chosen to subscribe Excel 2000. AutoCAD 2004 field (424) has not been selected, indicating that AutoCAD 2004 application is made available to User 1 (318) on Client Computer 1 (210) by the system administrator, but User 1 (318) has decided not to subscribe the application. The subscribed applications will appear on the desktop or program menu of Client Computer 1 (210) as if they have been installed on the local drive of the client computer.

Figure 5A:
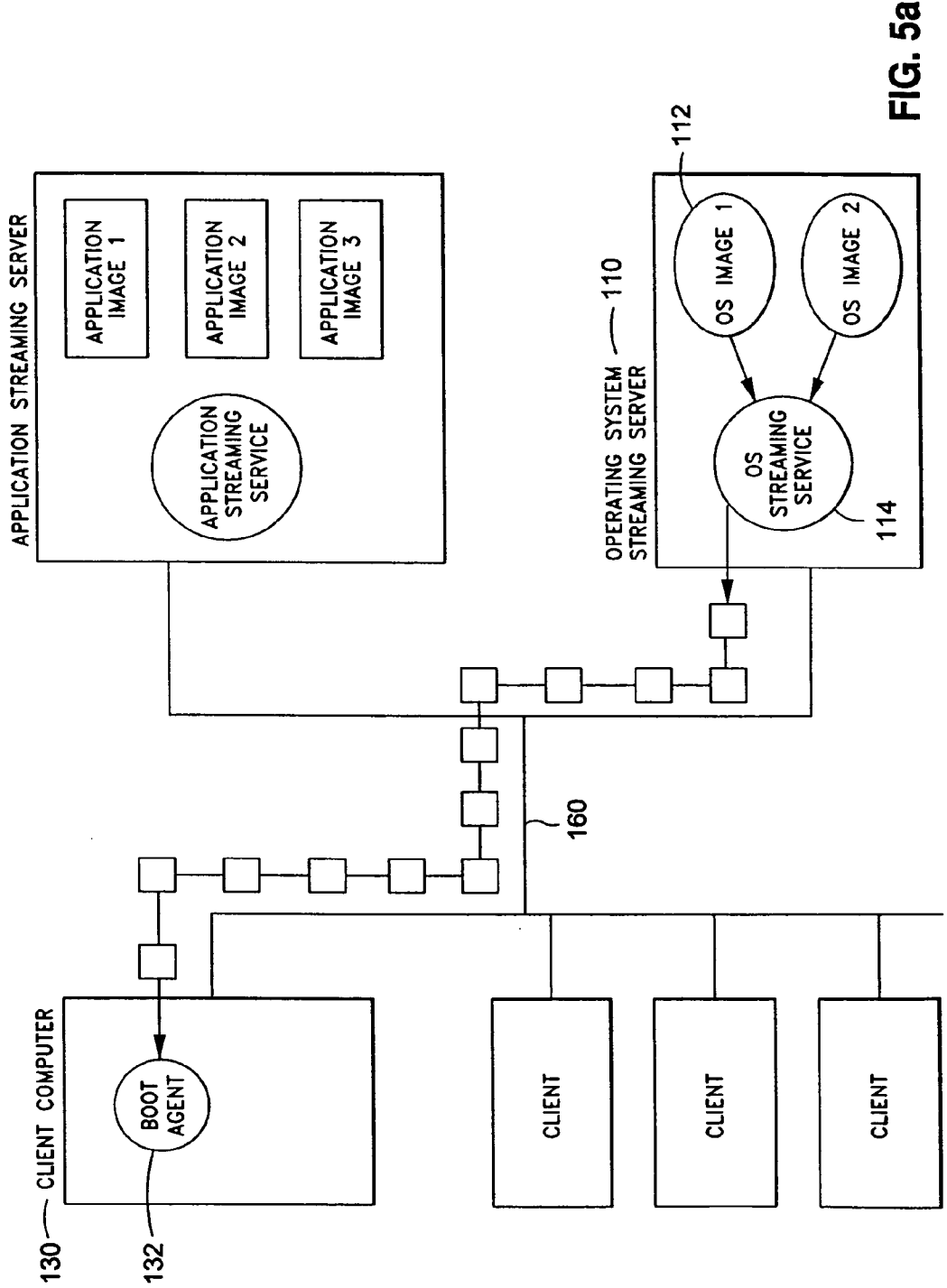
FIG. 5a illustrates an overview of the Operating System Streaming process.

FIG. 5a illustrates an overview of the Operating System Streaming process. As shown in FIG. 5a, operating system is delivered to Client Computer (130) on-demand by streaming Operating System Image (112) a block at a time from Operating System Streaming Server (110) to OS Streaming Agent (132). In a preferred embodiment, the operating streaming service is accomplished by Operating System Streaming Service (114) and OS Streaming Agent (132) communicating over Network (160). The techniques for Operating Streaming are well known in the art. See, e.g., U.S. Pat. No. 5,974,547, "Technique for Reliable Network Booting of an Operating System to a Client Computer" by Yevgeniy Klimenko, filed Mar. 20, 1998; Patrick Waddell, "Venturcom BXP 2.0 for Windows 2000 and Windows XP—Centralized Management of Network Attached Diskless Clients" published in 2002 by Venturcom. Note also that, as is customary in the art, the terms OS streaming, network boot, and remote boot are used interchangeably herein.

To briefly describe the operation of network boot and OS streaming, the booting process of a client computer starts at the ROM BIOS of the client computer which contains code for recognizing the network interface card (NIC) as an IPL Device (Initial Program Load Device) from which to boot and load an operating system. See, "BIOS Boot Specification", by Compaq Computer Corporation, Phoenix Technologies Ltd., and Intel Corporation, January 1996. The network card in turn must also be a bootable device such as a PXE-enabled NIC. PXE (Preboot Execution Environment) provides a way for network cards to initiate a network connection to servers before any OS is loaded so that the OS files can be downloaded over the network. See, "Preboot Execution Environment (PXE) Specification Version 2.1", by Intel Corporation, September 1999. The network card can also employ any preboot communication protocol known to those skilled in the art such as the IBM RPL (Remote Program Load) without departing from the scope of the present invention. When the client computer boots, the BIOS Boot code instructs the PXE-enabled NIC to provide the initial OS boot code, which in turn connects to a boot server, for example, Operating System Streaming Server (110), to download the initial OS boot code. As a part of the initial boot code, OS Streaming Agent (132) traps the pre-OS disk access requests (INT 13 in PC architecture) and redirects them to the PXE-enabled NIC so that the OS files can continued to be downloaded to the client computer. Once enough of the operating system has been downloaded so that the network stack and the file system are operational, OS Streaming Agent (132) transforms into an OS Streaming Agent that operates as a disk filter driver that redirects all disk requests to Operating System Streaming Server (110) over Network (160). Then, whenever more of OS are needed by Client Computer (130), the needed files are delivered by streaming that portion of Operating System Image (112) from Operating System Streaming Server (110) over Network (160) to OS Streaming Agent (132). Hence, the entire boot process is completely transparent to users on Client Computer (130). In a preferred embodiment, Operating System Streaming Service (114) reads Operating System Image (112) and communicates with OS Streaming Agent (132) to provide operating system streaming services.

In one embodiment, Operating System Image (112) is transparently streamed by redirecting the disk access requests on the client computer to a virtual disk over the network. In a preferred embodiment, the disk access redirection to the virtual disk for the OS Streaming system of the present invention operates at a disk drive device driver level in the layered device driver architecture of modern operating systems. For the description of the layered device driver architecture for the Microsoft Windows NT/2000/XP operating systems, see, David A. Solomon and Mark E. Russinovich, "Inside Microsoft Windows 2000, Third Edition," Microsoft Press, 2000; and Rajeev Nagar, "Windows NT File System Internals," O'Reilly & Associates, 1997.

Application Streaming is accomplished by quite similar methodologies and processes as OS Streaming. Initially, Application Streaming Agent (134) is downloaded to Client Computer (130) as a part of the operating system. Because the management functions of the operating system delivery and applications delivery are integrated, the operating system is aware of what applications should be available without actually building the applications into the operating system images. In an alternative embodiment, the application settings can be communicated to the operating system running on Client Computer (130) through Application Streaming Agent (134) without departing from the scope of the present invention. The operating system then makes the applications available to users by presenting application icons or shortcuts on the OS desktop or program start menus.

FIG. 5b illustrates an overview of the Application Streaming process. When a user launches an application by clicking on the application icon, Application Streaming Agent (134) delivers the necessary application files on-demand by streaming Application Image (122) from Application Streaming Server (120) over Network (160). At the beginning of application launch, enough portions of Application Image (122) are downloaded to allow the application to run initially. Then, as the user utilizes the application program, further portions of Application Image (122) are delivered on-demand by streaming the necessary files to Client Computer (130). In a preferred embodiment, Application Streaming Service (124) reads Application Image (122) and communicates with Application Streaming Agent (134) to provide application streaming services.

In one embodiment, Application Streaming Agent (134) can operate in a manner similar to runtime object code debuggers. That is, when the needed application files are not found in the memory, the execution of the application is interrupted and Application Streaming Agent (134) communicates with Application Streaming Server (120) over Network (160) to download the desired file. The communication mechanism can be any network communication method known to those skilled in the art, including Socket and RPC, without departing from the scope of the present invention. Once the necessary files are downloaded, the execution of the application would continue.

In another embodiment, Application Streaming Agent (134) operates as a File System Driver, and redirects to Application Streaming Server (120) the disk access requests (called "page faults") to load the needed application files. The application streaming service then appears as a virtual file system to Client Computer (130), behaving as if the applications are being loaded from a file system on a local disk drive. For further details of applications streaming technology, see, U.S. Pat. No. 6,574,618, "Method and system for executing network streamed application," by Dan Eylon et al., filed Dec. 28, 2000.

It is important to note that, under the present invention, a distinction is made between the virtual disk of the OS Streaming service and the virtual file system of the Application Streaming service. In a preferred embodiment, the virtual disk redirection of OS Streaming service of the present invention operates at the disk drive device driver level, while the virtual file redirection of Application Streaming operates at the file system device driver level, such that the OS Streaming service and Application Streaming service operate transparently to each other without conflicts and with maximum flexibility. Nevertheless, both OS Streaming service and Application Streaming service can employ virtual disks as well as virtual file systems without departing from the scope of the present invention.

In yet another embodiment, application files streamed to Client Computer (130) are written out to a virtual disk for Client Computer (130), and then streamed back to Client Computer (130) on-demand as needed.

In yet another embodiment, a local storage cache can be added to Client Computer (130) to store files that have already been streamed to Client Computer (130), be it operating system or application files. Then, when a page fault is issued by the operating system on Client Computer (130), the system will first attempt to fulfill the file request from the local storage cache. Only when the desired file pages are not found on the local cache, the file pages are streamed from the servers, thereby improving the speed of response and reducing network traffic. Local cache storage can be any persistent storage device known to those skilled in the art, including a disk drive, a flash memory device, and a RAM disk, without departing from the scope of the present invention.

As shown in FIG. 5a and FIG. 5b, the present invention provides operating system images which are separate and distinct from application images. Combined with Integrated User Interface (140) where the management of operating system delivery is client computer specific and the management of application delivery is user specific, separate and distinct operating system images and application images provide integrated on-demand delivery of operating system and applications which are properly scalable. There is no need to build operating system images combined with application images for each user, wasting valuable storage spaces and computing resources.

According to another aspect of the invention, the present invention can include an integrated common database for managing the operating system delivery and the application delivery. By combining Integrated User Interface (140) with Integrated Common Database (150), the integrated management functions are greatly simplified and made more robust and reliable. Because all of the system information are managed within the same database system, the entries can be cross-referenced and cross-checked for errors and consistency. Integrated Common Database (150) can be implemented with any database system known to those skilled in the art, including, but not limited to, Microsoft Access, SQL Server, and Oracle, without departing from the scope of the present invention.

Integrated Common Database (150) of the present invention is deployed on Database Server (152). As discussed above, Database Server (152) is a logical unit which can be placed on a single physical server hardware or multiple physical servers such as server farms or server clusters. Moreover, Operating System Streaming Server (110), Application Streaming Server (120), and Database Server (152) are all logical units that can be placed on separate physical servers or on the same physical server machine.

Figure 6D:
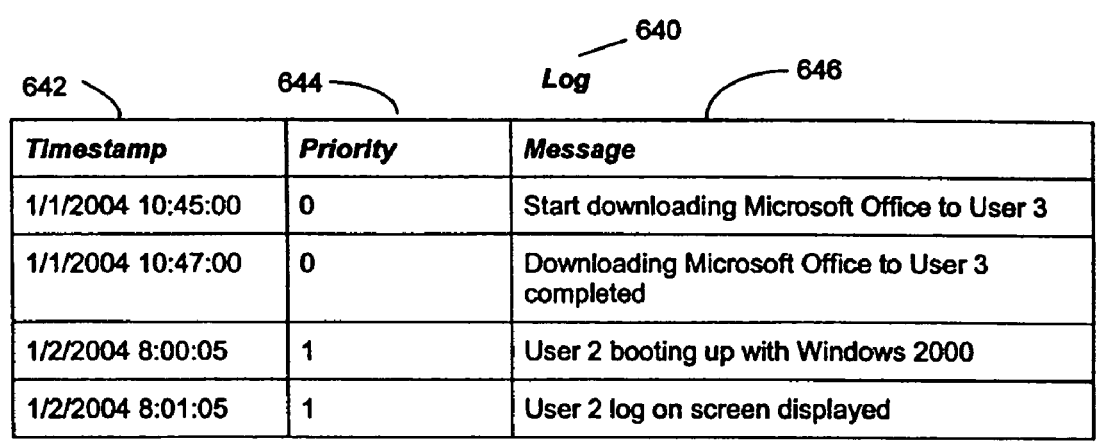

FIG. 6a to FIG. 6g illustrate the possible entities in Integrated Common Database (150) according to the present invention. FIG. 6a shows Account entity (610) with Account Name field (612) and Department field (614). FIG. 6b shows Application entity (620) with Application Name field (622), Image field (624), Image Size field (626), Active field (628), and OS field (630). Shown in FIG. 6c is License Usage entity (630) with Application field (632), Maximum Users field (634), and Current Users field (636). FIG. 6d illustrates Log entity (640) with Timestamp field (642), Priority field (644), and Message field (646). Shown in FIG. 6e is Client Machine entity (650) with Machine Name field (652), Mac Address field (654), IP Address field (656), and Default User field (658). As well known to those skilled in the art, the Mac Address uniquely identifies the network device at the Link or Physical Layer such as the Ethernet address for a network interface card supporting Ethernet protocol, and the IP Address uniquely identifies a network device at the Network or IP Layer. FIG. 6f provides an illustration of Server entity (670) with Server Name field (672), IP Address field (674), and Port field (676). As well known to those skilled in the art, the Port number identifies a service connection endpoint at an IP Address. Finally, FIG. 6g shows Operating System entity (680) with OS Name field (682), Image field (684), Image Size field (686), and Active field (688).

In operation, a system administrator would configure operating systems for client computers and applications for users utilizing Integrated User Interface (140) on Centralized Management Console (142). The information about users, client computers, operating system images, and application images are stored and accessed through Integrated Common Database (150) running on Database Server (152). For example, Integrated User Interface (140) accesses information about User 1 (230) from Account entity (610) in Integrated Common Database (150), and information about Client Computer 1 (210) from Client Machine entity (650). When an operating system is selected on Integrated Common Database (150), the image file for the selected operating system is obtained by looking up OS Name field (682) and Image field (684) of Operating System entity (680). Similarly, when an application is selected, the image file for the application is obtained by looking up Application Name field (622) and Image field (624) of Application entity (620) in Integrated Common Database (150). The licenses for the operating systems and applications are managed with License Usage entity (630). Once the system administrator configures the client computers and users, and makes operating systems and applications available to them, the users can further configure their own installations with Client User Interface (402) which also access and store information via the database entities in Integrated Common Database (150). Once configuration and installation has been completed, Operating System Streaming Server (110) ascertains which file to stream by looking up OS Name field (682) and Image field (684) of Operating System entity (680), and which client computer to which to stream the operating system image file by looking Machine Name field (652) and IP Address field (656) of Client Machine entity (650). IP Address field (656) uniquely identifies a computer on a network at the Network or IP Layer. Mac Address field (654) field of Client Machine entity (650) can also be used to uniquely identify a computer on a network at the Link or Physical Layer. Operating System Streaming Server (110) then opens a communication connection, typically a socket connection, with OS Streaming Agent (132) to stream the operating system image file. Application Streaming Agent (134) is streamed to client computers as a part of OS download or streaming. Once Application Streaming Agent (134) is running on client computers, applications are streamed via a process analogous to OS streaming.

By providing separate and distinct OS images and application images, and implementing the operating management functions at the client machine level of specificity and application management functions at the user level of specificity, the present invention provides an inherently canonical architecture that allows proper scaling and affords appropriate security management functions. The result is a complete, scalable, robust, and reliable server-centric application and operating system management system with a lower total cost of ownership than existing products.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A system for streaming one or more operating system images and one or more application images to a remote device, comprising:
   an applications module configured to determine a dependency between at least one operating system and at least one application;
   an integrated interface module configured to permit a user to independently select, based on the determined dependency, at least one operating system image comprising the at least one operating system, and at least one application image comprising the at least one application, to stream to the remote device;
   an application streaming agent configured to stream a first portion of the at least one application image to the remote device to allow the at least one application to initially run, and configured to stream, on-demand, a second portion of the at least one application image to the remote device in response to the at least one application initially running; and
   a memory configured to store at least one of the at least one operating system image and the at least one application image,
   wherein the determined dependency between the at least one operating system and the at least one application comprises determining whether the at least one application is compatible with the at least one operating system.

2. The system of claim 1, further comprising an operating system streaming agent configured to stream the at least one operating system image to the remote device.

3. The system of claim 1, further comprising an integrated common database configured to manage streaming of the at least one operating system image and streaming of the selected at least one application image to the remote device.

4. The system of claim 1, wherein the integrated interface module includes a web-based user interface.

5. The system of claim 1, further comprising a virtual disk configured for at least one of writing out paging files when running applications on the remote device, streaming the at least one operating system image, and streaming the at least one application image.

6. The system of claim 1, further comprising a virtual file system by which the at least one application image is streamed.

7. The system of claim 1, wherein at least one of a portion of the at least one operating system image and a portion of the at least one application image is configured to be stored in a storage cache local to the remote device.

8. A method for streaming one or more operating system images and one or more application images to a remote device, comprising:
   receiving, from a user, independent selections of at least one operating system and at least one application to stream to the remote device;
   determining a dependency between the selected at least one operating system and the selected at least one application; and
   streaming, based on the dependency between the selected at least one operating system and the selected at least one application, at least one operating system image comprising the selected at least one operating system to the remote device;
   streaming to the remote device a first portion of at least one application image comprising the selected at least one application to allow the selected at least one application to initially run; and
   streaming, on-demand to the remote device, a second portion of the at least one application image in response to the selected at least one application initially running,
   wherein the determining the dependency between the selected at least one operating system and the selected at least one application comprises determining whether the selected at least one application is compatible with the selected at least one operating system.

9. The method of claim 8, wherein the streaming the selected at least one operating system image to the remote device is in response to accessing of the remote device by a user local to the remote device.

10. The method of claim 8, further comprising managing the streaming of the at least one operating system image and the streaming of the at least one application image to the remote device using an integrated common database.

11. The method of claim 8, wherein the integrated interface module includes a web-based user interface.

12. The method of claim 8, further comprising at least one of writing out paging files when running applications on the remote device, streaming the at least one operating system image, and streaming the at least one application image, using a virtual disk.

13. The method of claim 8, wherein the at least one application image is streamed using a virtual file system.

14. The method of claim 8, further comprising:
   storing, on a storage cache local to the remote device, at least one of a portion of the selected at least one operating system image and
   a portion of the at least one application image.

15. A non-transitory computer-readable medium encoded with instructions, the instructions comprising code for:
   receiving, from a user, independent selections of at least one operating system and at least one application to stream to a remote device;

determining a dependency between the selected at least one operating system and the selected at least one application; and streaming, based on the dependency between the selected at least one operating system and the selected at least one application, at least one operating system image comprising the selected at least one operating system to the remote device;

streaming to the remote device a first portion of at least one application image comprising the selected at least one application to allow the selected at least one application to initially run; and streaming, on-demand to the remote device, a second portion of the at least one application image in response to the selected at least one application initially running, wherein the determining the dependency between the selected at least one operating system and the selected at least one application comprises determining whether the selected at least one application is compatible with the selected at least one operating system.

16. The computer-readable medium of claim 15, wherein the at least one application image is streamed using a virtual file system.

17. The computer-readable medium of claim 15, further comprising code for at least one of writing out paging files when running applications on the remote device, streaming the at least one operating system image, and streaming the at least one application image, using a virtual disk.

* * * * *